United States Patent
Aoki

(10) Patent No.: US 8,107,214 B2
(45) Date of Patent: *Jan. 31, 2012

(54) MULTILAYER CAPACITOR ARRAY HAVING TERMINAL CONDUCTOR, TO WHICH INTERNAL ELECTRODES ARE CONNECTED IN PARALLEL, CONNECTED IN SERIES TO EXTERNAL ELECTRODES

(75) Inventor: Takashi Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 401 days.

This patent is subject to a terminal disclaimer.

(21) Appl. No.: 12/365,554

(22) Filed: Feb. 4, 2009

(65) Prior Publication Data
US 2009/0201627 A1    Aug. 13, 2009

(30) Foreign Application Priority Data
Feb. 13, 2008    (JP) ............... P2008-032315

(51) Int. Cl.
 H01G 4/005    (2006.01)
 H01G 4/228    (2006.01)
 H01G 4/06    (2006.01)
(52) U.S. Cl. ........... 361/303; 361/306.3; 361/321.2
(58) Field of Classification Search ........... 361/306.3, 361/306.1, 303, 321.2, 309
See application file for complete search history.

(56) References Cited

U.S. PATENT DOCUMENTS

| | | | |
|---|---|---|---|
| 6,266,229 B1 | 7/2001 | Naito et al. | |
| 6,366,443 B1 | 4/2002 | Devoe et al. | |
| 6,370,010 B1 | 4/2002 | Kuroda et al. | |
| 6,407,906 B1 | 6/2002 | Ahiko et al. | |
| 6,441,459 B1 | 8/2002 | Togashi et al. | |
| 6,452,781 B1 | 9/2002 | Ahiko et al. | |
| 6,515,842 B1 | 2/2003 | Hayworth et al. | |
| 6,577,491 B1 | 6/2003 | Ohtsuka et al. | |
| 6,621,682 B1 | 9/2003 | Takakuwa et al. | |
| 6,768,630 B2 | 7/2004 | Togashi | |
| 6,819,543 B2 | 11/2004 | Vieweg et al. | |
| 6,934,145 B2 | 8/2005 | Hsieh et al. | |
| 6,972,942 B2 | 12/2005 | Ritter et al. | |
| 7,310,217 B2 | 12/2007 | Takashima et al. | |
| 7,369,395 B2 * | 5/2008 | Togashi | 361/303 |
| 7,411,776 B2 | 8/2008 | Aoki | |
| 7,436,650 B2 | 10/2008 | Oguni et al. | |
| 7,636,230 B2 * | 12/2009 | Aoki | 361/303 |
| 2007/0211405 A1 * | 9/2007 | Togashi | 361/303 |
| 2007/0279836 A1 | 12/2007 | Takashima et al. | |
| 2008/0013250 A1 * | 1/2008 | Aoki | 361/306.3 |

(Continued)

FOREIGN PATENT DOCUMENTS
JP    A-4242309    8/1992
(Continued)

*Primary Examiner* — Eric Thomas
*Assistant Examiner* — David M Sinclair
(74) *Attorney, Agent, or Firm* — Oliff & Berridge, PLC

(57) ABSTRACT

A multilayer capacitor array achieves a high ESR because terminal conductors to which internal electrodes in capacitance sections are connected in parallel are connected in series through internal electrodes in ESR control sections to external electrodes. Since in the multilayer capacitor array the internal electrodes extend as far as a boundary between capacitor element portions, electrostriction occurs in an entire laminate including a region near the boundary between the capacitor element portions, with application of a voltage from the outside. Therefore, concentration of stress due to electrostriction is avoided, so as to suppress occurrence of cracking or the like.

3 Claims, 11 Drawing Sheets

U.S. PATENT DOCUMENTS

2008/0084651 A1 4/2008 Oguni et al.
2008/0239623 A1* 10/2008 Aoki .......................... 361/306.3

FOREIGN PATENT DOCUMENTS

| JP | 06084689 A * | 3/1994 |
| JP | 06084690 A * | 3/1994 |
| JP | A-10-335168 | 12/1998 |
| JP | A-11-26291 | 1/1999 |
| JP | A-11-67507 | 3/1999 |
| JP | A-2000-331879 | 11/2000 |
| JP | A-2002-305125 | 10/2002 |
| JP | A-2004-22859 | 1/2004 |
| JP | 2004047707 A * | 2/2004 |
| JP | A-2004-273701 | 9/2004 |
| JP | B-3682392 | 8/2005 |
| JP | A-2006-165514 | 6/2006 |
| JP | A-2006-203168 | 8/2006 |
| JP | A-2007-13132 | 1/2007 |
| JP | A-2008-21797 | 1/2008 |

* cited by examiner (a)

(b)

MULTILAYER CAPACITOR ARRAY HAVING TERMINAL CONDUCTOR, TO WHICH INTERNAL ELECTRODES ARE CONNECTED IN PARALLEL, CONNECTED IN SERIES TO EXTERNAL ELECTRODES

BACKGROUND OF THE INVENTION

1. Field of the Invention

The present invention relates to a multilayer capacitor array.

2. Relate Background Art

A conventional multilayer capacitor array is, for example, the one described in Japanese Patent Application Laid-open No. 2000-331879. This conventional multilayer capacitor array is constructed in a structure in which dielectric layers and internal electrodes are alternately laminated together. The multilayer capacitor array of this configuration is formed by applying an electroconductive paste to become the internal electrodes, onto ceramic greens to become the dielectric layers, so as to form separate patterns in a plurality of regions.

SUMMARY OF THE INVENTION

Incidentally, a commonly-used multilayer capacitor array has a structure in which all the internal electrodes are connected in parallel through a lead conductor to the corresponding external electrodes. This configuration has the problem that it is difficult to achieve a sufficient equivalent series resistance (which will be referred to hereinafter as ESR) of the multilayer capacitor array.

This problem becomes more prominent with increase in the number of laminated layers of the dielectric layers and internal electrodes for increasing the capacitance of the multilayer capacitor array. Therefore, with the multilayer capacitor arrays, there is a demand for development of a technology to increase the ESR without change in the number of laminated layers of the dielectric layers and internal electrodes.

In the above-described multilayer capacitor array, electrostriction occurs locally in portions where the internal electrodes overlap, with application of a voltage from the outside. For this reason, stress due to the electrostriction is concentrated in a portion without the internal electrodes between capacitor element portions, so that cracking or the like can occur there.

The present invention has been accomplished in order to solve the above problem and an object of the present invention is to provide a multilayer capacitor array capable of achieving a high ESR while relieving the stress concentration due to electrostriction.

In order to accomplish the above object, a multilayer capacitor array according to the present invention is a multilayer capacitor array comprising: a laminate in which a plurality of dielectric layers are laminated together; internal electrodes formed in a plurality of layers in the laminate; and a plurality of terminal conductors and a plurality of external electrodes formed on side faces of the laminate and electrically isolated from each other, the multilayer capacitor array comprising an array of a plurality of capacitor element portions in which the internal electrodes are opposed to each other with the dielectric layer in between, wherein each of the capacitor element portions has: an ESR control section in which a first internal electrode connected to a first polarity and a second internal electrode connected to a second polarity are opposed to each other with at least one dielectric layer in between; and a capacitance section in which a third internal electrode connected to the first polarity and a fourth internal electrode connected to the second polarity are opposed to each other with at least one dielectric layer in between, wherein in the ESR control section, the first internal electrode is connected through a lead conductor to a first terminal conductor and to a first external electrode, and the second internal electrode is connected through a lead conductor to a second terminal conductor and to a second external electrode, and wherein in the capacitance section, the fourth internal electrode is connected through a lead conductor to the second terminal conductor only, and the third internal electrode is connected through a lead conductor to the first terminal conductor only, is formed in the same layer as the fourth internal electrode in the capacitance section of an adjacent capacitor element portion, and extends as far as a predetermined boundary between the capacitor element portions.

In this multilayer capacitor array, the internal electrodes in the capacitance section are connected to the terminal conductors only and the internal electrodes in the ESR control section are connected to the terminal conductors and to the external electrodes. Since in this configuration the terminal conductors to which the internal electrodes are connected in parallel are connected in series to the external electrodes, it is feasible to achieve a higher ESR than in the conventional case where the internal electrodes are connected in parallel to the external electrodes. In this multilayer capacitor array, the internal electrodes of the same polarity are aligned at the predetermined boundary between the capacitor element portions. For this reason, electrostriction will occur in the entire laminate including the region near the boundary between the capacitor element portions with application of a voltage from the outside. Therefore, the stress concentration due to electrostriction is avoided and thus the occurrence of cracking or the like can be suppressed. Even if the internal electrodes of the same polarity are located in proximity, this proximate portion does not contribute to the capacitance and thus the capacitance of the multilayer capacitor array is prevented from fluctuating.

Preferably, in the ESR control section, the first internal electrode is formed in the same layer as the second internal electrode in the ESR control section of the adjacent capacitor element portion and extends as far as the boundary between the capacitor element portions. This configuration reduces the number of laminated layers in each capacitor element portion. Since in the ESR control section the first internal electrode also extends as far as the boundary between the capacitor element portions, it becomes feasible to more adequately avoid the stress concentration due to electrostriction.

Preferably, an internal electrode in the ESR control section is connected to a polarity different from that to which an internal electrode in the capacitance section adjacent to the foregoing internal electrode in the ESR control section is connected, when viewed from a laminate direction of the dielectric layers. In this case, it is feasible to ensure a sufficient capacitance of the multilayer capacitor array.

The multilayer capacitor array according to the present invention successfully achieves the high ESR while relieving the stress concentration due to electrostriction.

DESCRIPTION OF THE PREFERRED EMBODIMENTS

The preferred embodiments of the multilayer capacitor array according to the present invention will be described below in detail with reference to the drawings.

Figure 1:
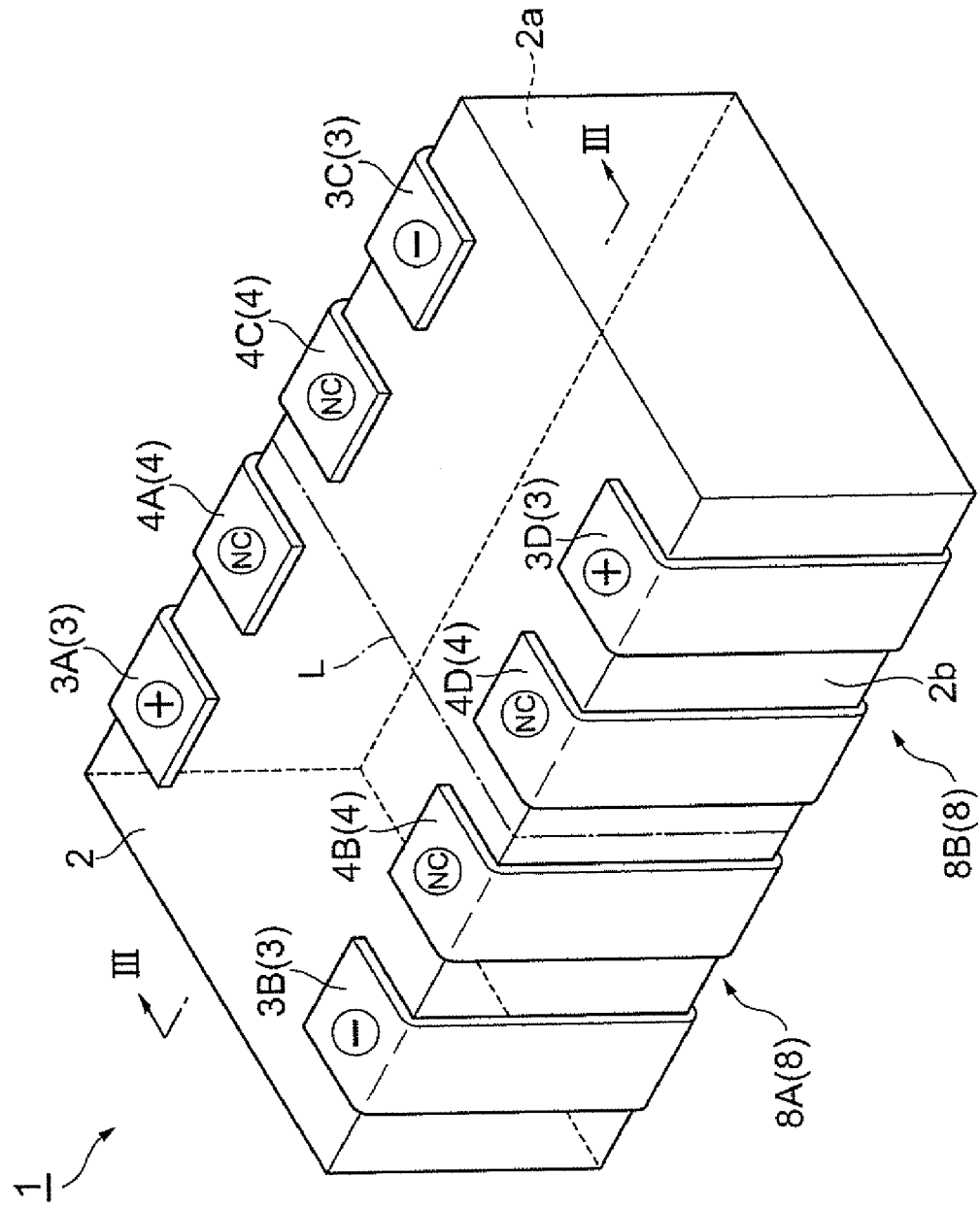
FIG. 1 is a perspective view showing an embodiment of the multilayer capacitor array according to the present invention.
Figure 2:
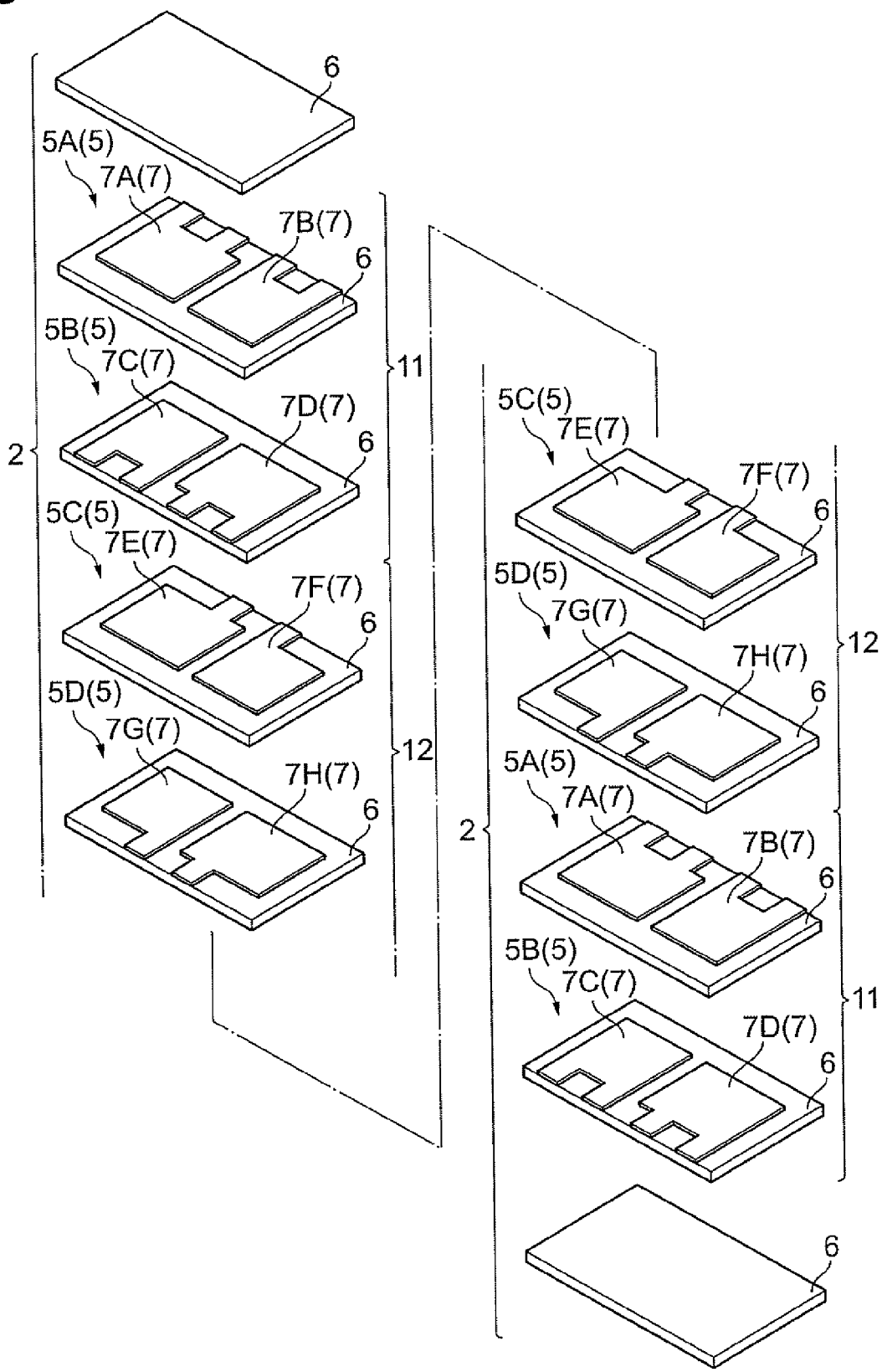
FIG. 2 is a drawing showing a layer structure of the multilayer capacitor array shown in FIG. 1.

FIG. 1 is a perspective view showing an embodiment of the multilayer capacitor array according to the present invention. FIG. 2 is a drawing showing a layer configuration of the multilayer capacitor array shown in FIG. 1 and FIG. 3 a sectional view along line III-III in FIG. 1.

Figure 3:
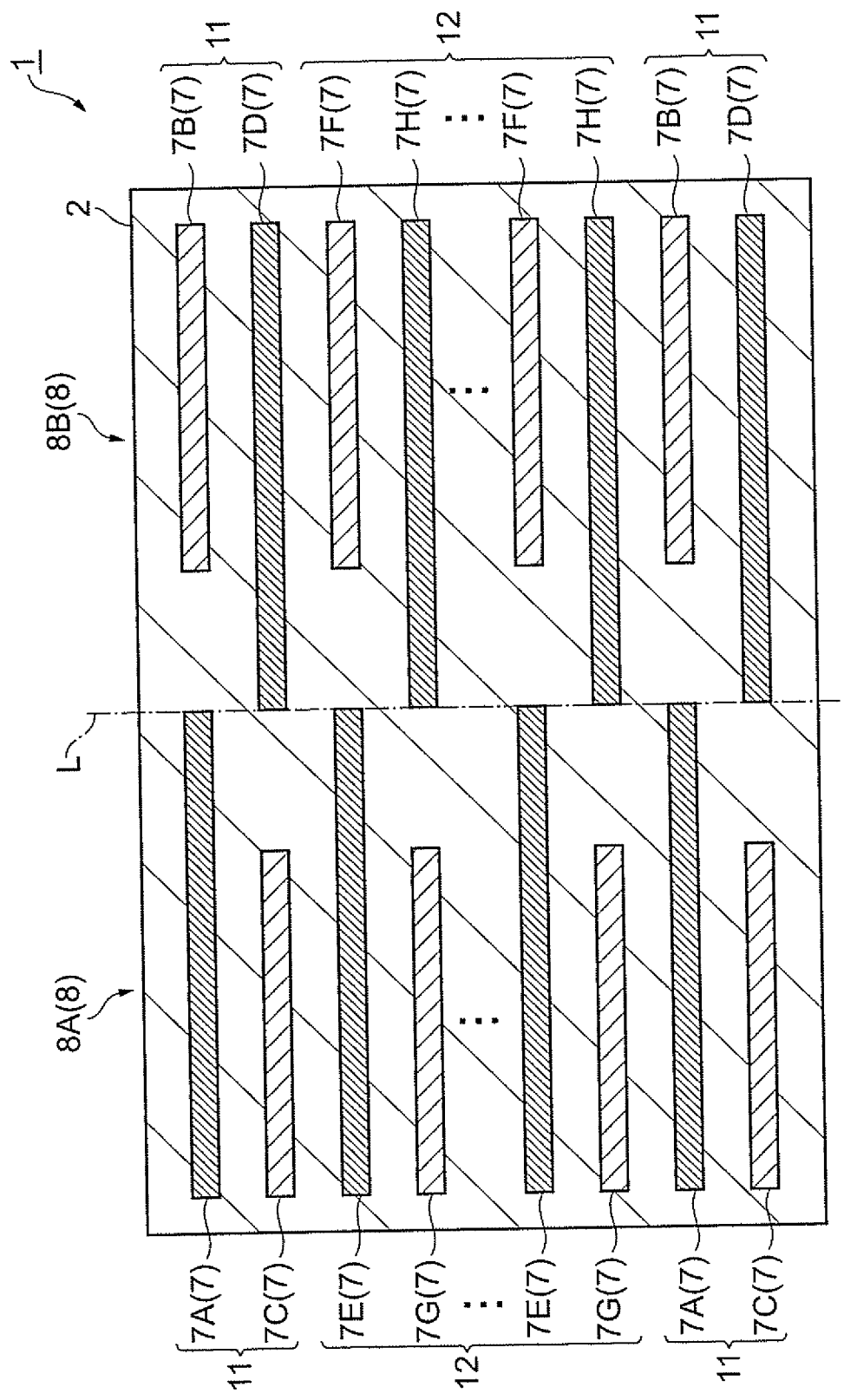
FIG. 3 is a sectional view along line III-III in FIG. 1.

As shown in FIGS. 1 to 3, the multilayer capacitor array 1 has a laminate 2, and external electrodes 3 (3A-3D) and terminal conductors 4 (4A-4D) formed on side faces of the laminate.

The laminate 2, as shown in FIG. 2, is formed in a nearly rectangular parallelepiped shape as composed of a plurality of complex layers 5 in each of which internal electrodes 7 of different patterns are formed on a dielectric layer 6, and dielectric layers 6, 6 laminated together with the complex layer 5 in between and functioning as protecting layers. Each dielectric layer 6 consists of a sintered body of a ceramic green sheet containing a dielectric ceramic, and each internal electrode 7 consists of a sintered body of an electroconductive paste.

In this laminate 2, the complex layers 5 are so laminated that a plurality of layers of internal electrodes 7 are opposed to each other with the dielectric layer 6 in between, whereby a pair of capacitor element portions 8 (8A, 8B) are formed along an arrangement direction of the external electrodes 3 and terminal conductors 4 (cf. FIG. 3). The layers are integrally formed so that no border can be visually recognized between the dielectric layers 6, 6 in the practical multilayer capacitor array 1.

The external electrodes 3 and terminal conductors 4 are made by firing an electroconductive paste containing electroconductive metal powder and glass frit. Each external electrode 3 is an electrode to be connected to a predetermined polarity upon mounting the multilayer capacitor array 1. Each terminal conductor 4 is a conductor to connect the internal electrodes 7 belonging to a later-described capacitance section 12 in the capacitor element portion 8, in parallel to each other, and so-called NC (No Contact) conductor not connected directly to a mounting board.

The external electrodes 3 and terminal conductors 4 each are provided on both of two side faces 2a, 2b along a laminate direction of the complex layers 5 in the laminate 2. The external electrodes 3 and terminal conductors 4 extend in a beltlike shape in the aforementioned laminate direction on the side faces 2a, 2b and have pad portions spreading over the end faces of the laminate 2 in the laminate direction.

On one side face 2a there are the following external electrodes and terminal conductors arranged from left to right in FIG. 1: external electrode (first external electrode) 3A connected to the positive polarity (first polarity); terminal conductor (first terminal conductor) 4A being an NC conductor; terminal conductor (second terminal conductor) 4C being an NC conductor; external electrode (second external electrode) 3C connected to the negative polarity (second polarity).

On the other side face 2b there are the following external electrodes and terminal conductors arranged from left to right in FIG. 1: external electrode (second external electrode) 3B connected to the negative polarity; terminal conductor (second terminal conductor) 4B being an NC conductor; terminal conductor (first terminal conductor) 4D being an NC conductor; external electrode (first external electrode) 3D connected to the positive polarity. The external electrodes 3A-3D and the terminal conductors 4A-4D are arranged in a state in which they are separated at predetermined intervals and are electrically isolated from each other.

The capacitor element portion 8 will be described below.

The capacitor element portion 8, as shown in FIGS. 2 and 3, is composed of ESR control sections 11 to control the ESR of multilayer capacitor array 1, and a capacitance section 12 mainly contributing to the capacitance of the multilayer capacitor array 1.

Figure 4:
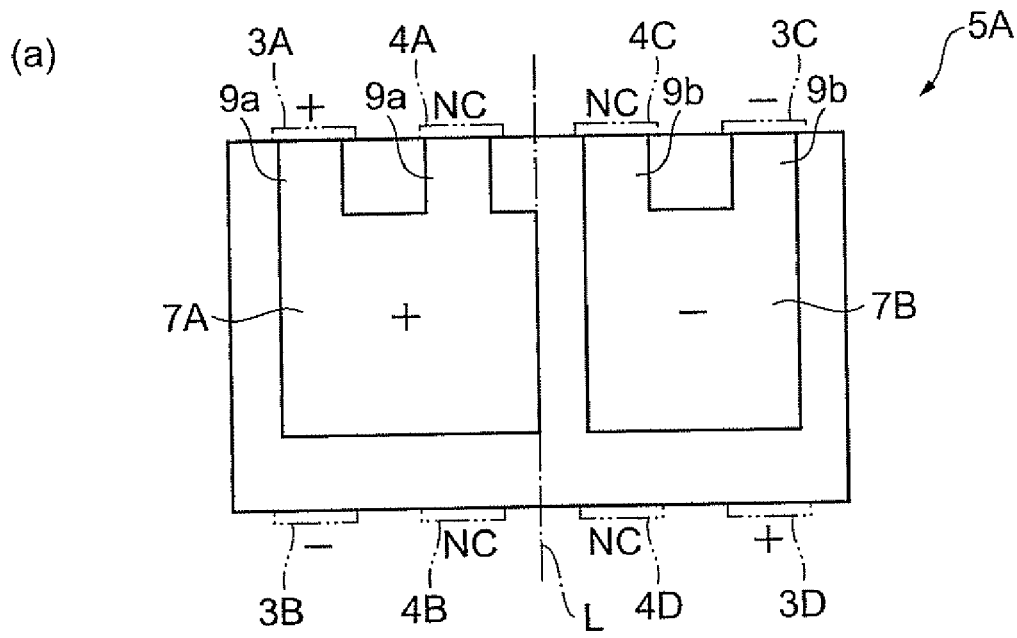
FIG. 4 is a drawing showing complex layers in an ESR control section.
Figure 4:
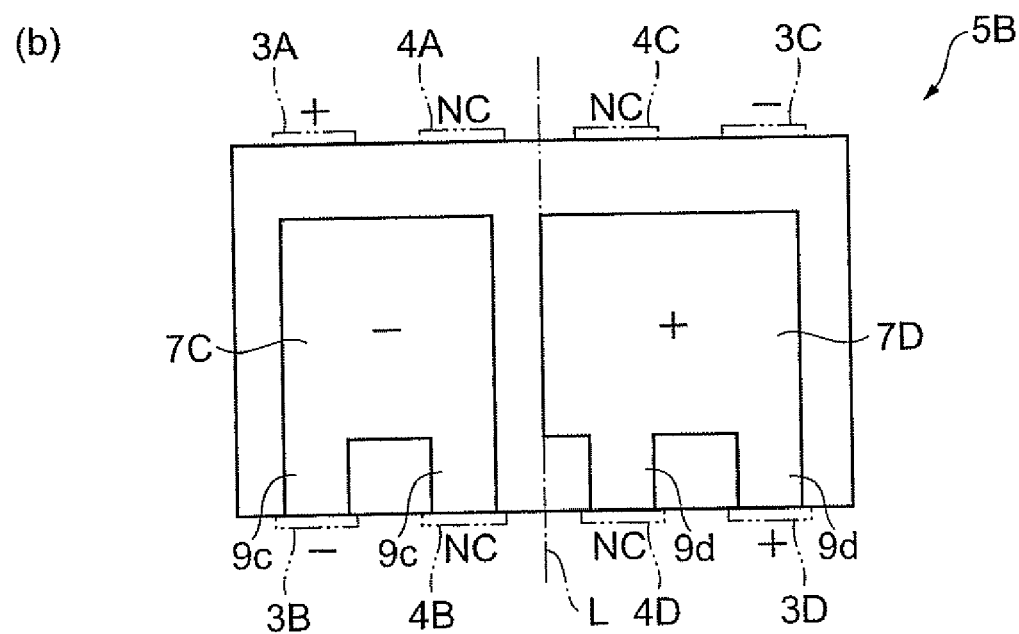

The ESR control sections 11 are arranged so as to sandwich the capacitance section 12 between them when viewed from the laminate direction of the complex layers 5. The ESR control sections 11, as shown in FIG. 4, are formed in a structure in which two complex layers 5A, 5B of different internal electrode patterns are laminated.

In the complex layer 5A, an internal electrode (first internal electrode) 7A and an internal electrode (second internal electrode) 7B are formed in respective regions partitioned by a boundary L between the capacitor element portions 8A, 8B, as shown in FIG. 4(a). Each of the internal electrode 7A and the internal electrode 7B is a rectangular pattern.

The internal electrode 7A is connected through lead electrodes 9a, 9a to the external electrode 3A and to the terminal conductor 4A and has the positive polarity in a mounted state of the multilayer capacitor array. The internal electrode 7B is connected through lead electrodes 9b, 9b to the external electrode 3C and to the terminal conductor 4C and has the negative polarity in the mounted state of the multilayer capacitor array.

In the complex layer 5B, an internal electrode (second internal electrode) 7C and an internal electrode (first internal electrode) 7D are formed in respective regions partitioned by the boundary L between the capacitor element portions 8A, 8B, as shown in FIG. 4(b). The internal electrode 7C and the internal electrode 7D are rectangular patterns symmetrical with the internal electrode 7A and the internal electrode 7B, with respect to the boundary L.

The internal electrode 7C is connected through lead electrodes 9c, 9c to the external electrode 3B and to the terminal conductor 4B and has the negative polarity in the mounted state of the multilayer capacitor array. The internal electrode 7D is connected through lead electrodes 9d, 9d to the external electrode 3D and to the terminal conductor 4D and has the positive polarity in the mounted state of the multilayer capacitor array.

In each of the ESR control sections 11 in the capacitor element portion 8A, the aforementioned two complex layers 5A, 5B are laminated whereby the internal electrode 7A connected to the positive polarity and the internal electrode 7C connected to the negative polarity are opposed to each other in the laminate direction with at least one dielectric layer 6 in between.

In each of the ESR control sections 11 in the capacitor element portion 8B, the complex layers 5A, 5B are laminated whereby the internal electrode 7D connected to the positive polarity and the internal electrode 7B connected to the negative polarity are opposed to each other in the laminate direction with at least one dielectric layer 6 in between, in a state in which the polarities are reversed in the laminate direction from those in the ESR control sections 11 in the capacitor element portion 8A.

Figure 5:
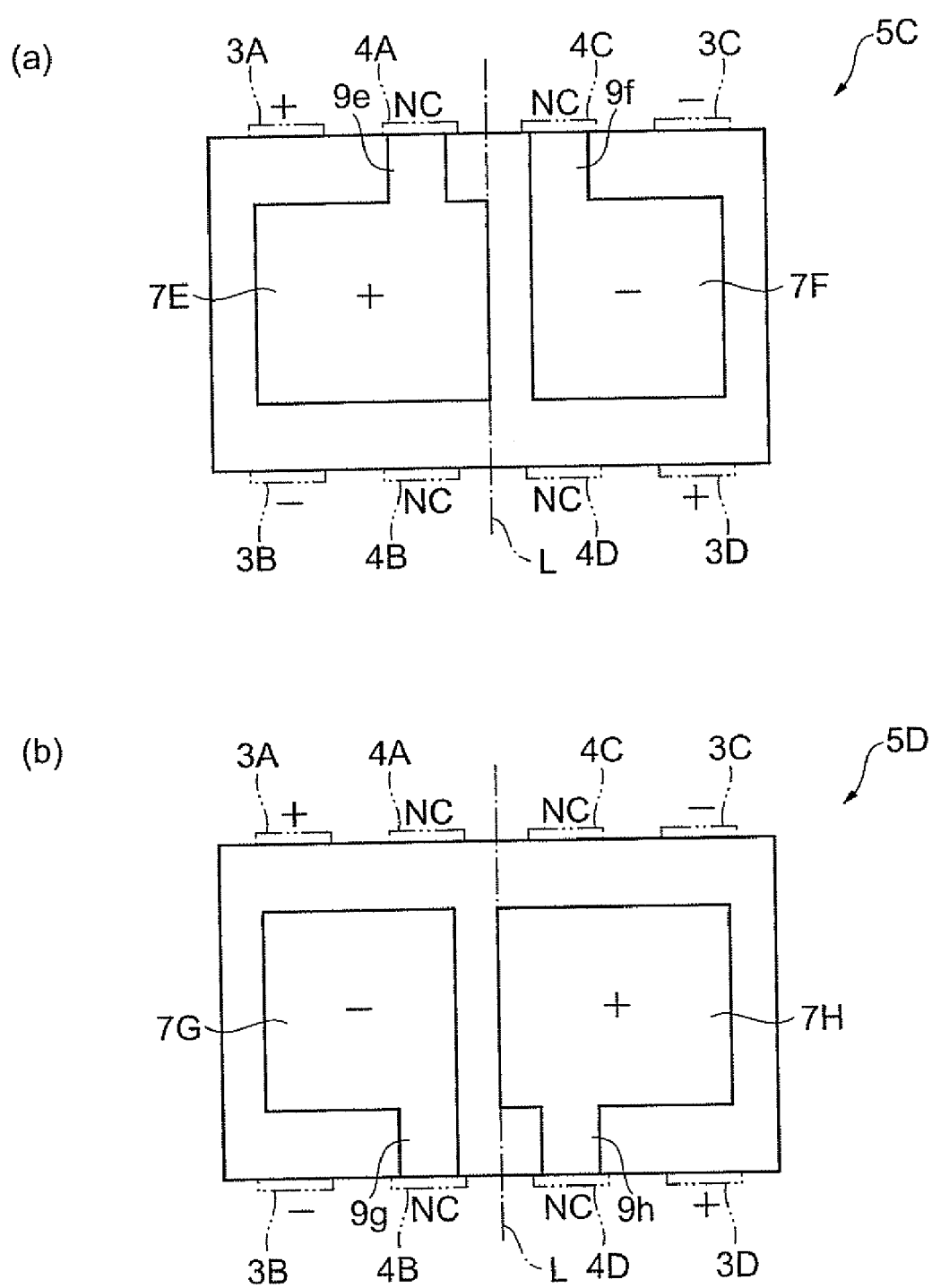
FIG. 5 is a drawing showing complex layers in a capacitance section.

On the other hand, the capacitance sections 12, as shown in FIG. 5, are formed so that two types of complex layers 5C, 5D of different internal electrode patterns are alternately laminated in multiple repetitions. In a complex layer 5C, an internal electrode (third internal electrode) 7E and an internal electrode (fourth internal electrode) 7F are formed in respective regions partitioned by the boundary L between the capacitor element portions 8A, 8B, as shown in FIG. 5(a). Each of the internal electrode 7E and the internal electrode 7F is a rectangular pattern as the internal electrode 7A and the internal electrode 7B.

The internal electrode 7E is connected through a lead electrode 9e to the terminal conductor 4A only and is connected through the terminal conductor 4A and through the internal electrodes 7A in the ESR control sections 11 to the external electrode 3A. This causes the internal electrode 7E to have the positive polarity in the mounted state of the multilayer capacitor array. The internal electrode 7F is connected through a lead electrode 9f to the terminal conductor 4C only and is connected through the terminal conductor 4C and through the internal electrodes 7B in the ESR control sections 11 to the external electrode 3C. This causes the internal electrode 7F to have the negative polarity in the mounted state of the multilayer capacitor array.

In the complex layer 5D, an internal electrode (fourth internal electrode) 7G and an internal electrode (third internal electrode) 7H are formed in respective regions partitioned by the boundary L between the capacitor element portions 8A, 8B, as shown in FIG. 5(b). The internal electrode 7G and the internal electrode 7H are rectangular patterns symmetrical with the internal electrode 7E and the internal electrode 7F, with respect to the boundary L.

The internal electrode 7G is connected through a lead electrode 9g to the terminal conductor 4B only and is connected through the terminal conductor 4B and through the internal electrodes 7C in the ESR control sections 11 to the external electrode 3B. This causes the internal electrode 7G to have the negative polarity in the mounted state of the multilayer capacitor array. The internal electrode 7H is connected through a lead electrode 9h to the terminal conductor 4D only and is connected through the terminal conductor 4D and through the internal electrodes 7D in the ESR control sections 11 to the external electrode 3D. This causes the internal electrode 7H to have the positive polarity in the mounted state of the multilayer capacitor array.

In the capacitance section 12 in the capacitor element portion 8A, the aforementioned two types of complex layers 5C, 5D are laminated in multiple repetitions, whereby the internal electrodes 7E connected to the positive polarity and the internal electrodes 7G connected to the negative polarity are opposed to each other in the laminate direction with at least one dielectric layer 6 in between.

In the capacitance section 12 in the capacitor element portion 8B, the complex layers 5C, 5D are laminated in multiple repetitions, whereby the internal electrodes 7H connected to the positive polarity and the internal electrodes 7F connected to the negative polarity are opposed to each other in the laminate direction with at least one dielectric layer 6 in between, in a state in which the polarities are reversed in the laminate direction from those in the capacitance section 12 in the capacitor element portion 8A.

In the boundary region between one ESR control section 11 and the capacitance section 12, the complex layer 5B and the complex layer 5C are adjacent in the laminate direction. In the boundary region between the other ESR control section 11 and the capacitance section 12, the complex layer 5A and the complex layer 5D are adjacent in the laminate direction. In this configuration, when the laminate is viewed from the laminate direction, the internal electrode 7 of the ESR control section 11 and the internal electrode 7 of the capacitance section 12 adjacent thereto are connected to their respective polarities different from each other.

Furthermore, as shown in FIG. 3, the internal electrodes 7A, 7D, 7E, 7H connected to the positive polarity extend as far as the boundary L between the capacitor element portions 8A, 8B in the ESR control sections 11 and the capacitance sections 12. The internal electrodes 7A, 7D, 7E, 7H at different levels do not overlap with each other when viewed from the laminate direction, but their ends are aligned on the boundary L.

The spacing from the end of the internal electrode 7A, 7D, 7E, or 7H to the end of the internal electrode 7B, 7C, 7F, or 7G in the same layer is, for example, 100 μm or more. This configuration prevents contact between the internal electrode 7A, 7D, 7E, 7H and the internal electrode 7B, 7C, 7F, 7G due to a manufacturing error or the like.

Since the internal electrode 7A, 7D, 7E, 7H and the internal electrode 7B, 7C, 7F, 7G are formed in the same layer, the number of laminated layers in the capacitor element portions 8A, 8B is reduced thereby.

In the multilayer capacitor array 1, as described above, each of the internal electrodes 7 in the capacitance sections 12 is connected to the terminal conductor 4 only and each of the internal electrodes 7 in the ESR control sections 11 is connected to the terminal conductor 4 and to the external electrode 3. In this configuration, each terminal conductor 4 to which the internal electrodes 7 in the capacitance section 12 are connected in parallel is connected in series to the associated external electrode 3 through the internal electrodes 7 in the ESR control sections 11.

Therefore, the present embodiment is able to achieve a higher ESR than in the conventional case where the internal electrodes 7 are connected in parallel to the external electrodes 3. The increase in ESR prevents a sudden impedance drop at a resonant frequency and enables achievement of a wider bandwidth of the multilayer capacitor array 1.

In this multilayer capacitor array 1 all the internal electrodes 7 of the positive polarity belonging to the ESR control sections 11 and the capacitance sections 12 are aligned at different levels on the boundary L between the capacitor element portions 8A, 8B. Since the internal electrodes 7 extend as far as the boundary L between the capacitor element portions 8A, 8B, electrostriction occurs in the entire laminate 2 including the region near the boundary L between the capacitor element portions 8A, 8B, with application of a voltage from the outside. Therefore, the stress concentration due to electrostriction is avoided, so as to suppress occurrence of cracking or the like. Even if the internal electrodes 7 of the same polarity are located in proximity, this proximate portion does not contribute to the capacitance and therefore the capacitance of the multilayer capacitor array 1 is prevented from fluctuating.

In the multilayer capacitor array 1, the internal electrode 7 in the ESR control section 11 and the internal electrode 7 in the capacitance section 12 adjacent thereto when viewed from the laminate direction are connected to their respective polarities different from each other. This ensures a more adequate capacitance of the multilayer capacitor array 1.

A variety of modifications are applicable to the arrangement of the external electrodes 3 and the terminal conductors 4 and the patterns of the internal electrodes 7 in the complex layers 5.

Figure 6:
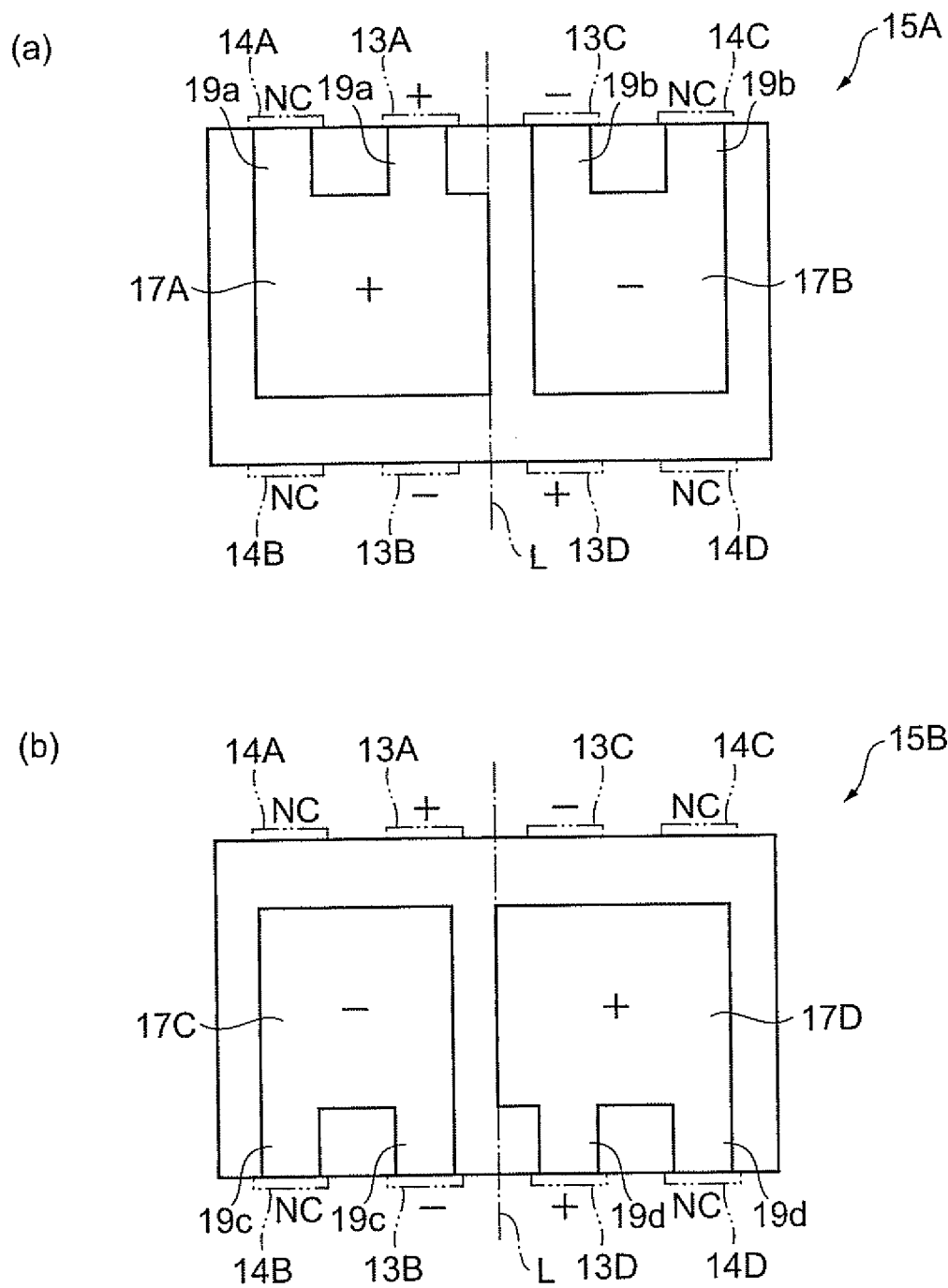
FIG. 6 is a drawing showing complex layers in an ESR control section in a first modification example.
Figure 7:
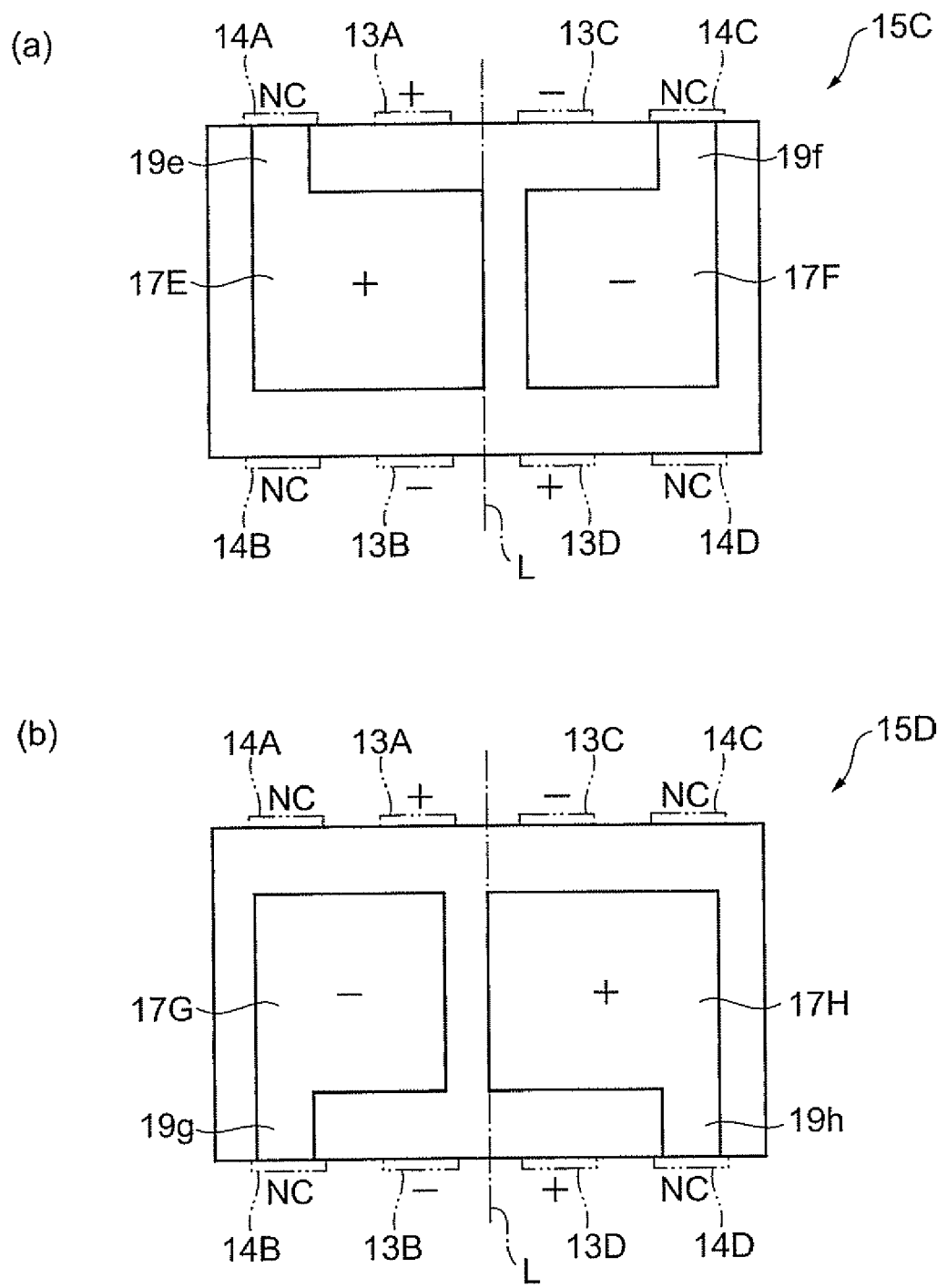
FIG. 7 is a drawing showing complex layers in a capacitance section in the first modification example.

FIGS. 6 and 7 are drawings showing a first modification example. In the first modification example, as shown in the same drawings, there are the following terminal conductors and external electrodes arranged from left to right in the drawings on one side face 2a of the laminate 2: terminal conductor (first terminal conductor) 14A being an NC conductor; external electrode (first external electrode) 13A connected to the positive polarity; external electrode (second external electrode) 13C connected to the negative polarity; terminal conductor (second terminal conductor) 14C being an NC conductor.

There are the following terminal conductors and external electrodes arranged from left to right in the drawings on the other side face 2b: terminal conductor (second terminal conductor) 14B being an NC conductor; external electrode (second external electrode) 13B connected to the negative polarity; external electrode (first external electrode) 13D connected to the positive polarity; terminal conductor (first terminal conductor) 14D being an NC conductor.

In the ESR control sections 11, as shown in FIG. 6, two complex layers 15A, 15B of different internal electrode patterns are laminated. In the complex layer 15A, an internal electrode (first internal electrode) 17A and an internal electrode (second internal electrode) 17B are formed in respective regions partitioned by the boundary L between the capacitor element portions 8A, 8B, as shown in FIG. 6(a). Each of the internal electrode 17A and the internal electrode 17B is a rectangular pattern.

The internal electrode 17A is connected through lead electrodes 19a, 19a to the external electrode 13A and to the terminal conductor 14A and has the positive polarity in the mounted state of the multilayer capacitor array. The internal electrode 17B is connected through lead electrodes 19b, 19b to the external electrode 13C and to the terminal conductor 14C and has the negative polarity in the mounted state of the multilayer capacitor array.

In the complex layer 15B, an internal electrode (second internal electrode) 17C and an internal electrode (first internal electrode) 17D are formed in respective regions partitioned by the boundary L between the capacitor element portions 8A, 8B, as shown in FIG. 6(b). The internal electrode 17C and the internal electrode 17D are rectangular patterns symmetrical with the internal electrode 17A and the internal electrode 17B, with respect to the boundary L.

The internal electrode 17C is connected through lead electrodes 19c, 19c to the external electrode 13B and to the terminal conductor 14B and has the negative polarity in the mounted state of the multilayer capacitor array. The internal electrode 17D is connected through lead electrodes 19d, 19d to the external electrode 13D and to the terminal conductor 14D and has the positive polarity in the mounted state of the multilayer capacitor array.

On the other hand, the capacitance sections 12, as shown in FIG. 7, are formed so that two types of complex layers 15C, 15D of different internal electrode patterns are alternately laminated in multiple repetitions. In the complex layer 15C, an internal electrode (third internal electrode) 17E and an internal electrode (fourth internal electrode) 17F are formed in respective regions partitioned by the boundary L between the capacitor element portions 8A, 8B, as shown in FIG. 7(a). Each of the internal electrode 17E and the internal electrode 17F is a rectangular pattern as the internal electrode 17A and the internal electrode 17B.

The internal electrode 17E is connected through a lead electrode 19e to the terminal conductor 14A only and is connected through the terminal conductor 14A and through the internal electrodes 17A in the ESR control sections 11 to the external electrode 13A. This causes the internal electrode 17E to have the positive polarity in the mounted state of the multilayer capacitor array. The internal electrode 17F is connected through a lead electrode 19f to the terminal conductor 14C only and is connected through the terminal conductor 14C and through the internal electrodes 17B in the ESR control sections 11 to the external electrode 13C. This causes the internal electrode 17F to have the negative polarity in the mounted state of the multilayer capacitor array.

In the complex layer 15D, an internal electrode (fourth internal electrode) 17G and an internal electrode (third internal electrode) 17H are formed in respective regions partitioned by the boundary L between the capacitor element portions 8A, 8B, as shown in FIG. 7(b). The internal electrode 17G and the internal electrode 17H are rectangular patterns symmetrical with the internal electrode 17E and the internal electrode 17F, with respect to the boundary L.

The internal electrode 17G is connected through a lead electrode 19g to the terminal conductor 14B only and is connected through the terminal conductor 14B and through the internal electrodes 17C in the ESR control sections 11 to the external electrode 13B. This causes the internal electrode 17G to have the negative polarity in the mounted state of the multilayer capacitor array. The internal electrode 17H is connected through a lead electrode 19h to the terminal conductor 14D only and is connected through the terminal conductor 14D and through the internal electrodes 17D in the ESR control sections 11 to the external electrode 13D. This causes the internal electrode 17H to have the positive polarity in the mounted state of the multilayer capacitor array.

In the ESR control sections 11 and the capacitance sections 12, the internal electrodes 17A, 17D, 17E, 17H connected to the positive polarity extend as far as the boundary L between the capacitor element portions 8A, 8B. The internal electrodes 17A, 17D, 17E, 17H at different levels do not overlap with each other when viewed from the laminate direction, but their ends are aligned on the boundary L.

Figure 8:
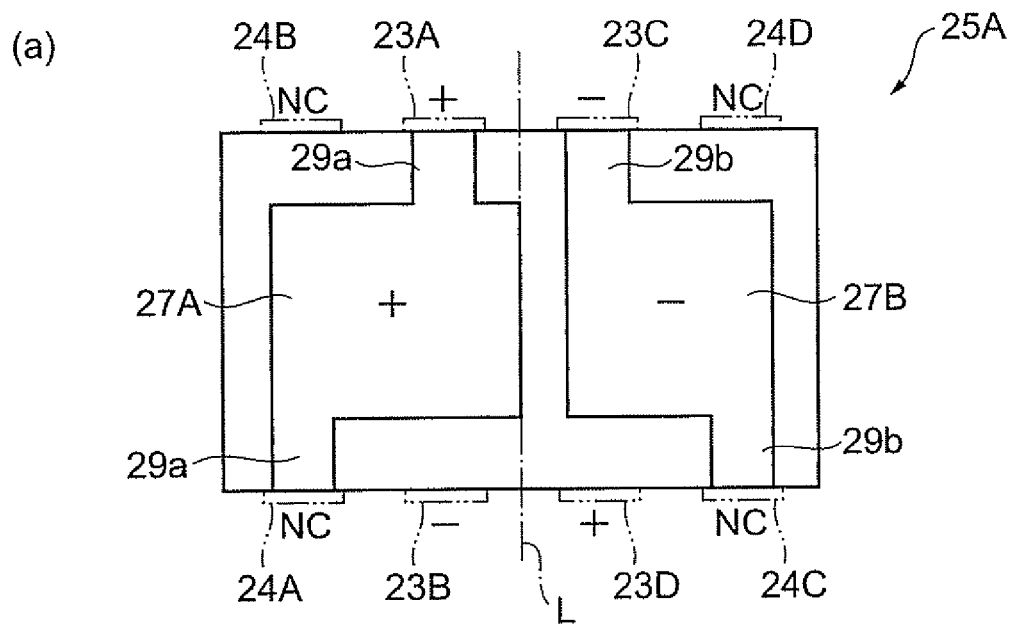
FIG. 8 is a drawing showing complex layers in an ESR control section in a second modification example.
Figure 8:
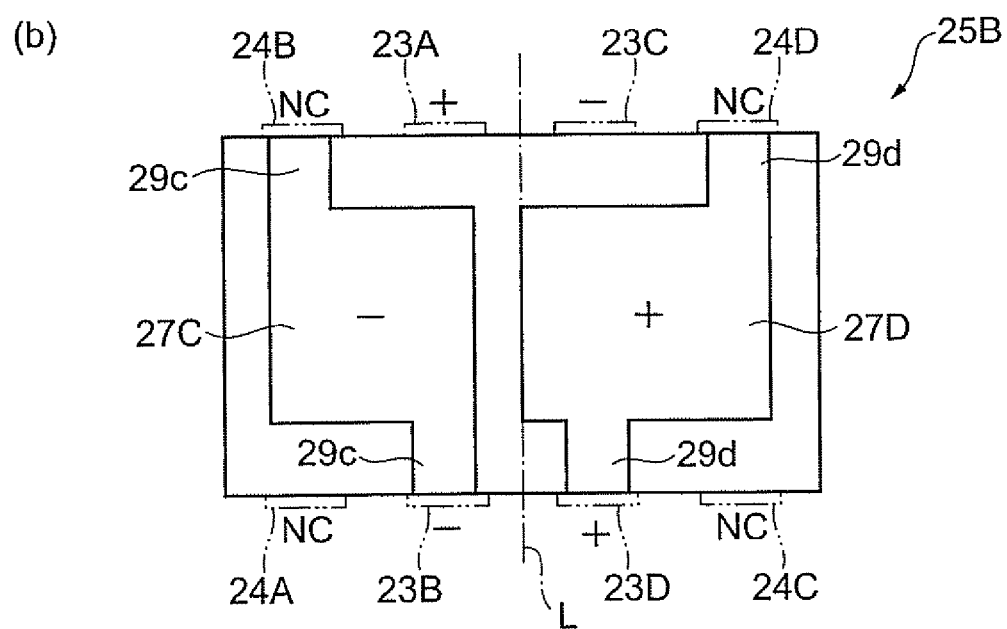
Figure 9:
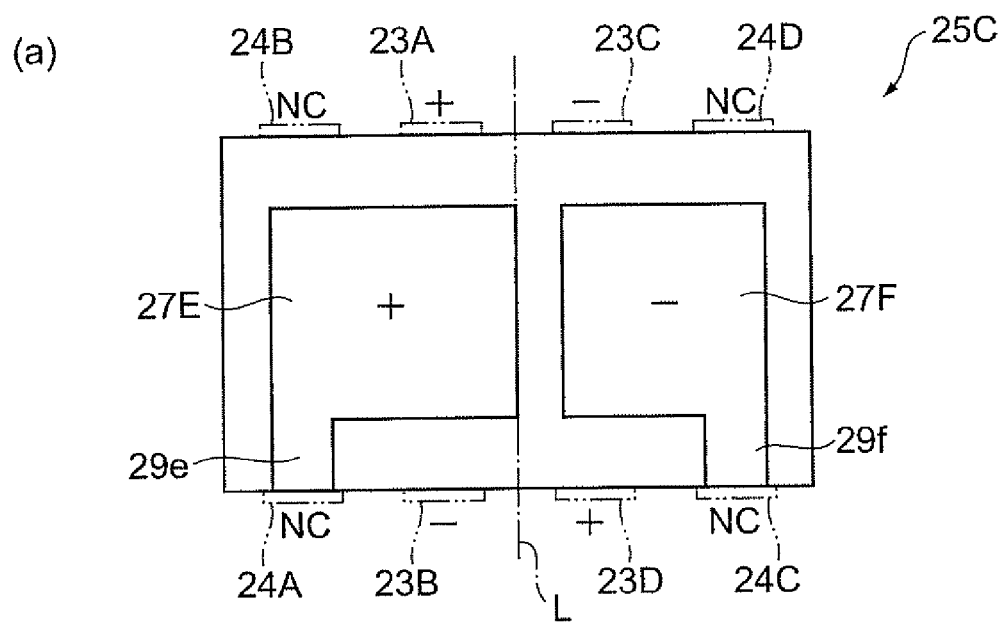
FIG. 9 is a drawing showing complex layers in a capacitance section in the second modification example.
Figure 9:
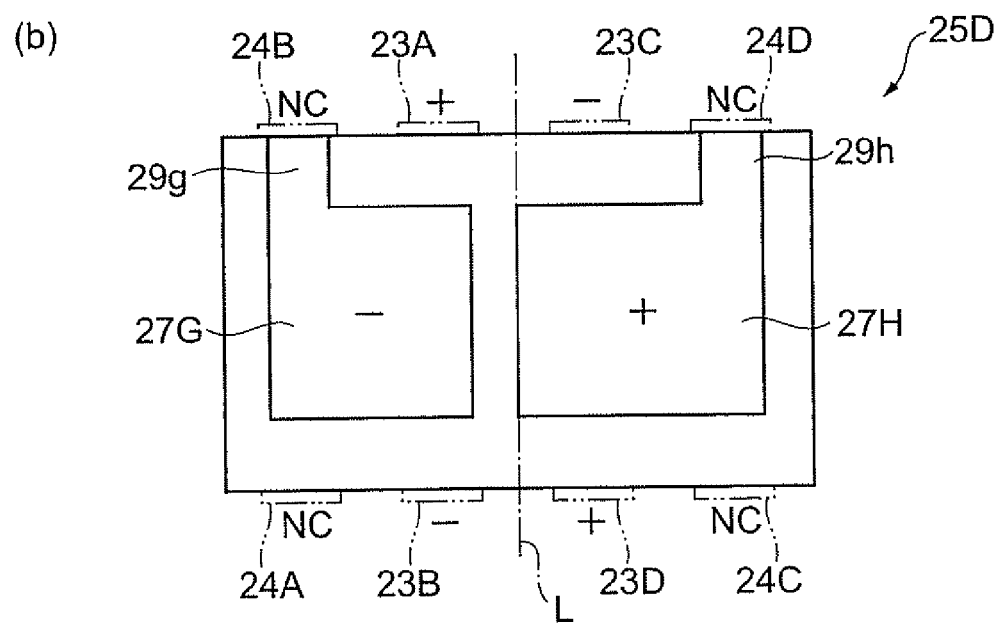

FIGS. 8 and 9 are drawings showing a second modification example. In the second modification example, as shown in the same drawings, there are the following terminal conductors and external electrodes arranged from left to right in the drawings on one side face 2a of the laminate 2: terminal conductor (second terminal conductor) 24B being an NC conductor; external electrode (first external electrode) 23A connected to the positive polarity; external electrode (second external electrode) 23C connected to the negative polarity; terminal conductor (first terminal conductor) 24D being an NC conductor.

On the other side face 2b there are the following terminal conductors and external electrodes arranged from left to right in the drawing: terminal conductor (first terminal conductor) 24A being an NC conductor; external electrode (second external electrode) 23B connected to the negative polarity; external electrode (first external electrode) 23D connected to the positive polarity; terminal conductor (second terminal conductor) 24C being an NC conductor.

The ESR control sections 11, as shown in FIG. 8, are formed so that two complex layers 25A, 25B of different internal electrode patterns are laminated. In the complex layer 25A, an internal electrode (first internal electrode) 27A and an internal electrode (second internal electrode) 27B are formed in respective regions partitioned by the boundary L between the capacitor element portions 8A, 8B, as shown in FIG. 8(a). Each of the internal electrode 27A and the internal electrode 27B is a rectangular pattern.

The internal electrode 27A is connected through lead electrodes 29a, 29a to the external electrode 23A and to the terminal conductor 24A and has the positive polarity in the mounted state of the multilayer capacitor array. The internal electrode 27B is connected through lead electrodes 29b, 29b to the external electrode 23C and to the terminal conductor 24C and has the negative polarity in the mounted state of the multilayer capacitor array.

In the complex layer 25B, an internal electrode (second internal electrode) 27C and an internal electrode (first internal electrode) 27D are formed in respective regions partitioned by the boundary L between the capacitor element portions 8A, 8B, as shown in FIG. 8(b). The internal electrode 27C and the internal electrode 27D are rectangular patterns symmetrical with the internal electrode 27A and the internal electrode 27B, with respect to the boundary L.

The internal electrode 27C is connected through lead electrodes 29c, 29c to the external electrode 23B and to the terminal conductor 24B and has the negative polarity in the mounted state of the multilayer capacitor array. The internal electrode 27D is connected through lead electrodes 29d, 29d to the external electrode 23D and to the terminal conductor 24D and has the positive polarity in the mounted state of the multilayer capacitor array.

On the other hand, the capacitance sections 12, as shown in FIG. 9, are formed so that two types of complex layers 25C, 25D of different internal electrode patterns are alternately laminated in multiple repetitions. In the complex layer 25C, an internal electrode (third internal electrode) 27E and an internal electrode (fourth internal electrode) 27F are formed in respective regions partitioned by the boundary L between the capacitor element portions 8A, 8B, as shown in FIG. 9(a). Each of the internal electrode 27E and the internal electrode 27F is a rectangular pattern as the internal electrode 27A and the internal electrode 27B.

The internal electrode 27E is connected through a lead electrode 29e to the terminal conductor 24A only and is connected through the terminal conductor 24A and through the internal electrodes 27A in the ESR control sections 11 to the external electrode 23A. This causes the internal electrode 27E to have the positive polarity in the mounted state of the multilayer capacitor array. The internal electrode 27F is connected through a lead electrode 29f to the terminal conductor 24C only and is connected through the terminal conductor 24C and through the internal electrodes 27B in the ESR control sections 11 to the external electrode 23C. This causes the internal electrode 27F to have the negative polarity in the mounted state of the multilayer capacitor array.

In the complex layer 25D, an internal electrode (fourth internal electrode) 27G and an internal electrode (third internal electrode) 27H are formed in respective regions partitioned by the boundary L between the capacitor element portions 8A, 8B, as shown in FIG. 9(b). The internal electrode 27G and the internal electrode 27H are rectangular patterns symmetrical with the internal electrode 27E and the internal electrode 27F, with respect to the boundary L.

The internal electrode 27G is connected through a lead electrode 29g to the terminal conductor 24B only and is connected through the terminal conductor 24B and through the internal electrodes 27C in the ESR control sections 11 to the external electrode 23B. This causes the internal electrode 27G to have the negative polarity in the mounted state of the multilayer capacitor array. The internal electrode 27H is connected through a lead electrode 29h to the terminal conductor 24D only and is connected through the terminal conductor 24D and through the internal electrodes 27D in the ESR control sections 11 to the external electrode 23D. This causes the internal electrode 27H to have the positive polarity in the mounted state of the multilayer capacitor array.

In the ESR control sections 11 and the capacitance sections 12, the internal electrodes 27A, 27D, 27E, 27H connected to the positive polarity extend as far as the boundary L between the capacitor element portions 8A, 8B. The internal electrodes 27A, 27D, 27E, 27H at different levels do not overlap with each other when viewed from the laminate direction, but their ends are aligned on the boundary L.

Figure 10:
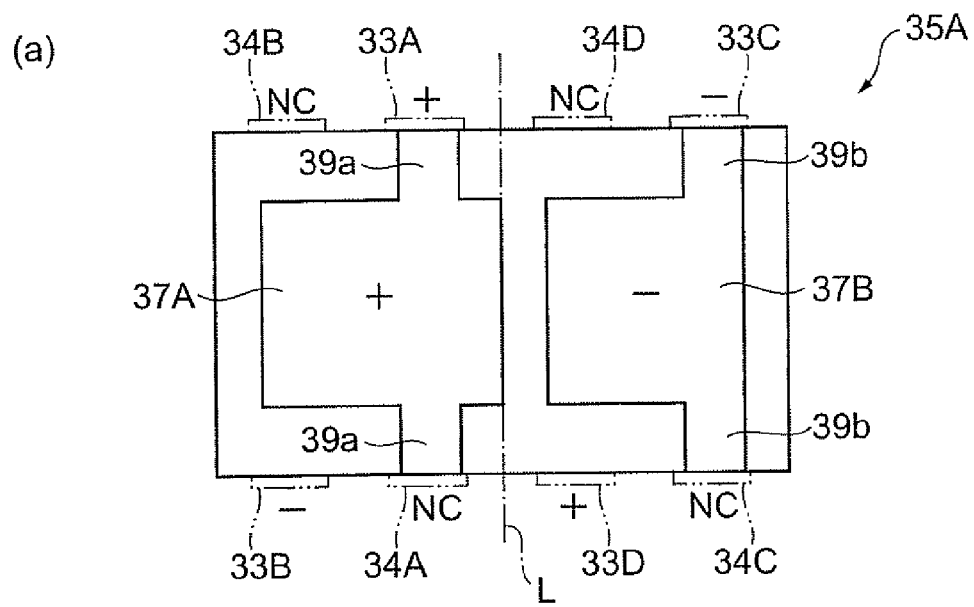
FIG. 10 is a drawing showing complex layers in an ESR control section in a third modification example.
Figure 10:
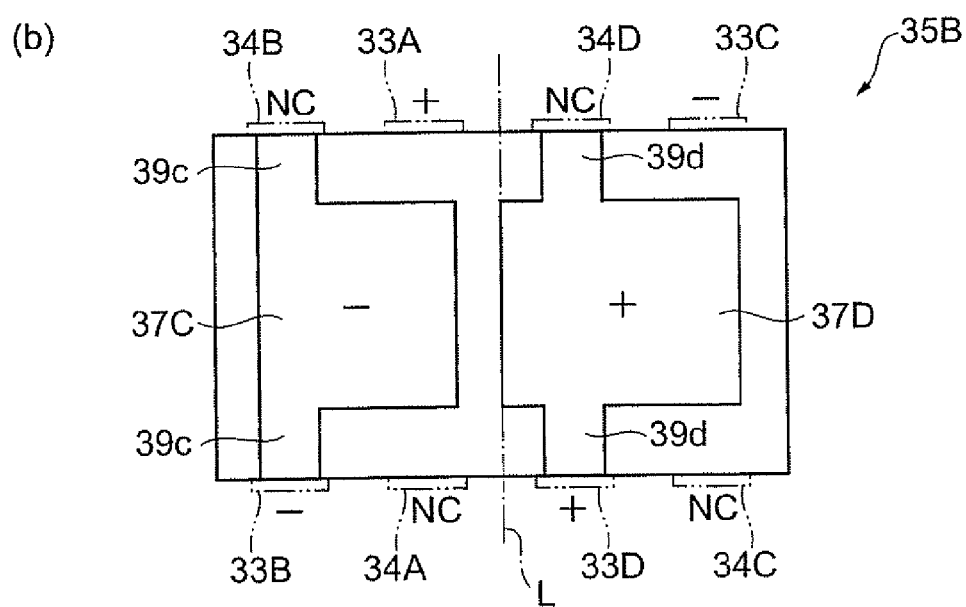
Figure 11:
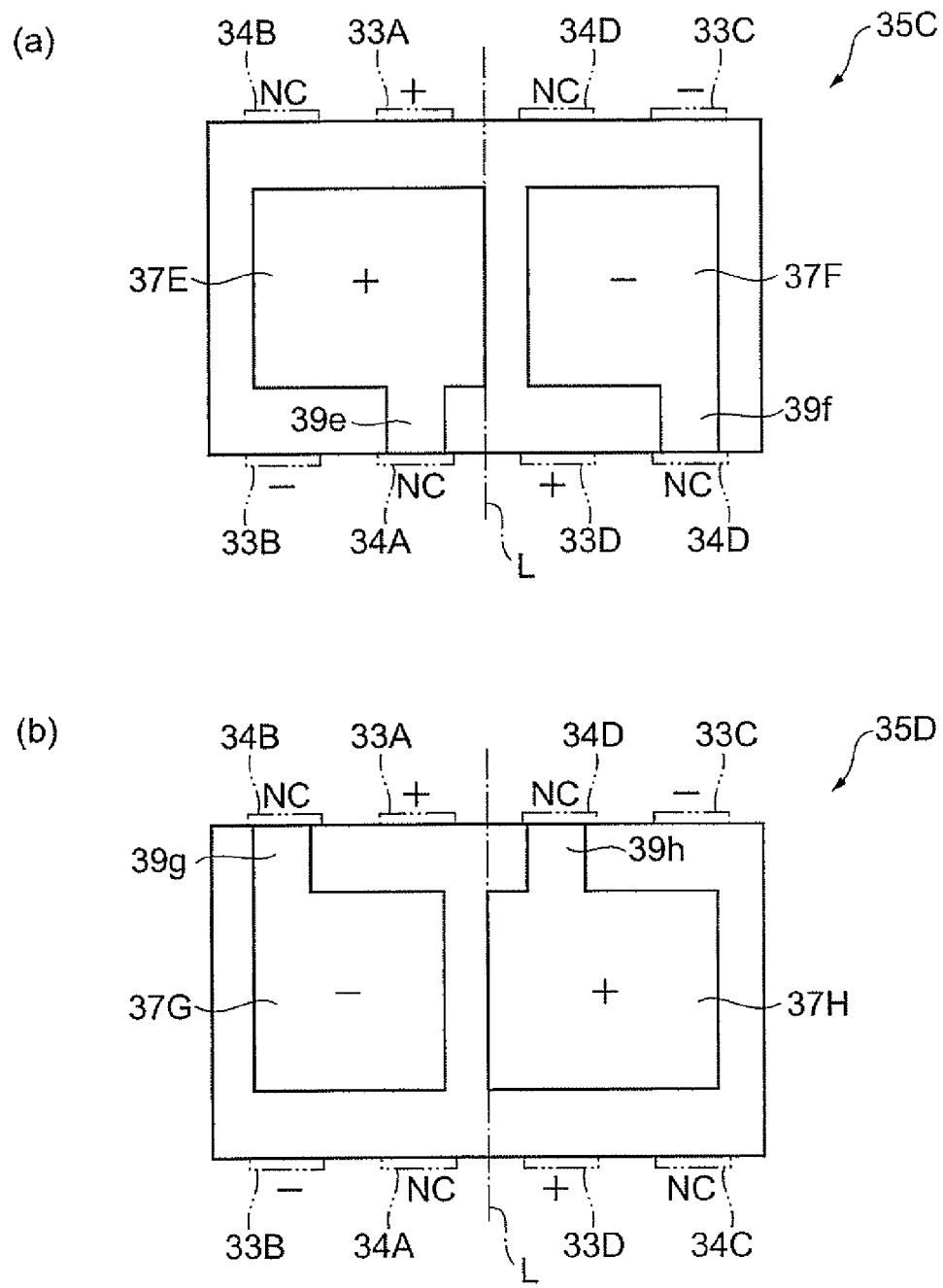
FIG. 11 is a drawing showing complex layers in a capacitance section in the third modification example.

FIGS. 10 and 11 are drawings showing a third modification example. In the third modification example, as shown in the same drawings, there are the following terminal conductors and external electrodes arranged from left to right in the drawings on one side face 2a of the laminate 2: terminal conductor (second terminal conductor) 34B being an NC conductor; external electrode (first external electrode) 33A connected to the positive polarity; the terminal conductor (first terminal conductor) 34D being an NC conductor; external electrode (second external electrode) 33C connected to the negative polarity.

On the other side face 2b there are the following external electrodes and terminal conductors arranged from left to right in the drawings: external electrode (second external electrode) 33B connected to the negative polarity; terminal conductor (first terminal conductor) 34A being an NC conductor; external electrode (first external electrode) 33D connected to the positive polarity; terminal conductor (second terminal conductor) 34C being an NC conductor.

The ESR control sections 11, as shown in FIG. 10, are formed so that two complex layers 35A, 35B of different internal electrode patterns are laminated. In the complex layer 35A, an internal electrode (first internal electrode) 37A and an internal electrode (second internal electrode) 37B are formed in respective regions partitioned by the boundary L between the capacitor element portions 8A, 8B, as shown in FIG. 10(a). Each of the internal electrode 37A and the internal electrode 37B is a rectangular pattern.

The internal electrode 37A is connected through lead electrodes 39a, 39a to the external electrode 33A and to the terminal conductor 34A and has the positive polarity in the mounted state of the multilayer capacitor array. The internal electrode 37B is connected through lead electrodes 39b, 39b to the external electrode 33C and to the terminal conductor 34C and has the negative polarity in the mounted state of the multilayer capacitor array.

In the complex layer 35B, an internal electrode (second internal electrode) 37C and an internal electrode (first internal electrode) 37D are formed in respective regions partitioned by the boundary L between the capacitor element portions 8A, 8B, as shown in FIG. 10(b). The internal electrode 37C and the internal electrode 37D are rectangular patterns symmetrical with the internal electrode 37A and the internal electrode 37B, with respect to the boundary L.

The internal electrode 37C is connected through lead electrodes 39c, 39c to the external electrode 33B and to the terminal conductor 34B and has the negative polarity in the mounted state of the multilayer capacitor array. The internal electrode 37D is connected through lead electrodes 39d, 39d to the external electrode 33D and to the terminal conductor 34D and has the positive polarity in the mounted state of the multilayer capacitor array.

On the other hand, the capacitance sections 12, as shown in FIG. 11, are formed so that two types of complex layers 35C, 35D of different internal electrode patterns are alternately laminated in multiple repetitions. In the complex layer 35C, an internal electrode (third internal electrode) 37E and an internal electrode (fourth internal electrode) 37F are formed in respective regions partitioned by the boundary L between the capacitor element portions 8A, 8B, as shown in FIG. 11(a). Each of the internal electrode 37E and the internal electrode 37F is a rectangular pattern as the internal electrode 37A and the internal electrode 37B.

The internal electrode 37E is connected through a lead electrode 39e to the terminal conductor 34A only and is connected through the terminal conductor 34A and through the internal electrodes 37A in the ESR control sections 11 to the external electrode 33A. This causes the internal electrode 37E to have the positive polarity in the mounted state of the multilayer capacitor array. The internal electrode 37F is connected through a lead electrode 39f to the terminal conductor 34C only and is connected through the terminal conductor 34C and through the internal electrodes 37B in the ESR control sections 11 to the external electrode 33C. This causes the internal electrode 37F to have the negative polarity in the mounted state of the multilayer capacitor array.

In the complex layer 35D, an internal electrode (fourth internal electrode) 37G and an internal electrode (third internal electrode) 37H are formed in respective regions partitioned by the boundary L between the capacitor element positions 8A, 8B, as shown in FIG. 11(b). The internal electrode 37G and the internal electrode 37H are rectangular patterns symmetrical with the internal electrode 37E and the internal electrode 37F, with respect to the boundary L.

The internal electrode 37G is connected through a lead electrode 39g to the terminal conductor 34B only and is connected through the terminal conductor 34B and through the internal electrodes 37C in the ESR control sections 11 to the external electrode 33B. This causes the internal electrode 37G to have the negative polarity in the mounted state of the multilayer capacitor array. The internal electrode 37H is connected through a lead electrode 39h to the terminal conductor 34D only and is connected through the terminal conductor 34D and through the internal electrodes 37D in the ESR control sections 11 to the external electrode 33D. This causes the internal electrode 37H to have the positive polarity in the mounted state of the multilayer capacitor array.

In the ESR control sections 11 and the capacitance sections 12, the internal electrodes 37A, 37D, 37E, 37H connected to the positive polarity extend as far as the boundary L between the capacitor element portions 8A, 8B. The internal electrodes 37A, 37D, 37E, 37H at different levels do not overlap with each other when viewed from the laminate direction, but their ends are aligned on the boundary L.

In the first to third modification examples described above, the terminal conductors to which the internal electrodes in the capacitance sections 12 are connected in parallel are connected in series to the external electrodes through the internal electrodes in the ESR control sections 11. Therefore, it is feasible to achieve a higher ESR than in the conventional case where the internal electrodes are connected in parallel to the external electrodes.

Since the internal electrodes extend as far as the boundary L between the capacitor element portions 8A, 8B, electrostriction occurs in the entire laminate 2 including the region near the boundary L between the capacitor element portions 8A, 8B, with application of a voltage from the outside. Therefore, the stress concentration due to electrostriction is avoided, so as to prevent the occurrence of cracking or the like.

It should be noted that the present invention is by no means limited to the above embodiments. For example, the foregoing embodiment showed the configuration wherein the ESR control sections 11 were provided so as to sandwich the capacitance section 12 between them in the laminate direction, but the ESR control sections 11 may be located anywhere in the laminate 2. The polarities connected to the external electrodes and the internal electrodes in the mounted state of the multilayer capacitor array may be opposite to those in the foregoing embodiment.

What is claimed is:

1. A multilayer capacitor array comprising:
   a laminate in which a plurality of dielectric layers are laminated together;
   internal electrodes formed in a plurality of layers in the laminate; and
   a plurality of terminal conductors and a plurality of external electrodes formed on side faces of the laminate and electrically isolated from each other,
   the multilayer capacitor array comprising an array of a plurality of capacitor element portions in which the internal electrodes are opposed to each other with the dielectric layer in between,
   wherein each of said capacitor element portions has:
   an ESR control section in which a first internal electrode connected to a first polarity and a second internal electrode connected to a second polarity are opposed to each other with at least one dielectric layer in between; and
   a capacitance section in which a third internal electrode connected to the first polarity and a fourth internal electrode connected to the second polarity are opposed to each other with at least one dielectric layer in between,
   wherein in said ESR control section,
   the first internal electrode is connected through a lead conductor to a first terminal conductor and to a first external electrode, and
   the second internal electrode is connected through a lead conductor to a second terminal conductor and to a second external electrode, and
   wherein in the capacitance section,
   the fourth internal electrode is connected through a lead conductor to the second terminal conductor only, and
   the third internal electrode is connected through a lead conductor to the first terminal conductor only, is formed in the same layer as the fourth internal electrode in the capacitance section of an adjacent capacitor element portion, and extends as far as a predetermined boundary between the capacitor element portions, and
   wherein the capacitance section is formed by laminating a plurality of complex layers together, and each of the complex layers comprises the dielectric layer, and the third internal electrode and the fourth internal electrode on the dielectric layer,
   the complex layers are laminated together so that the third internal electrode and the fourth internal electrode are alternately arranged, and
   ends of the third internal electrodes are aligned in the laminate direction of the dielectric layers in the adjacent complex layers.

2. The multilayer capacitor array according to claim 1, wherein in the ESR control section,
   the first internal electrode is formed in the same layer as the second internal electrode in the ESR control section of the adjacent capacitor element portion and extends as far as the boundary between the capacitor element portions.

3. The multilayer capacitor array according to claim 1, wherein an internal electrode in the ESR control section is connected to a polarity different from that to which an internal electrode in the capacitance section adjacent to said internal electrode in the ESR control section is connected, when viewed from a laminate direction of the dielectric layers.

* * * * *